(12) United States Patent
Ikeda

(10) Patent No.: US 8,488,080 B2
(45) Date of Patent: Jul. 16, 2013

(54) ILLUMINATION SYSTEM, LIQUID CRYSTAL DEVICE, AND ELECTRONIC DEVICE

(75) Inventor: Takuya Ikeda, Shiojiri (JP)

(73) Assignee: Japan Display West, Inc., Aichi-Ken (JP)

( * ) Notice: Subject to any disclaimer, the term of this patent is extended or adjusted under 35 U.S.C. 154(b) by 1248 days.

(21) Appl. No.: 11/831,553

(22) Filed: Jul. 31, 2007

(65) Prior Publication Data

US 2008/0043170 A1    Feb. 21, 2008

(30) Foreign Application Priority Data

Aug. 17, 2006  (JP) .................................. 2006-222281

(51) Int. Cl.
*G02F 1/1335* (2006.01)

(52) U.S. Cl.
USPC ............... 349/65; 349/64; 362/608; 362/617; 362/619

(58) Field of Classification Search
USPC .................. 349/64, 65; 362/608, 617, 619
See application file for complete search history.

(56) References Cited

U.S. PATENT DOCUMENTS

| | | | |
|---|---|---|---|
| 7,001,035 B2 | 2/2006 | Kawakami | |
| 7,097,340 B2 * | 8/2006 | Okuwaki et al. | 362/623 |
| 7,101,070 B2 * | 9/2006 | Yu et al. | 362/558 |
| 7,350,957 B2 * | 4/2008 | Liao | 362/621 |
| 7,357,552 B2 | 4/2008 | Takada | |
| 7,370,999 B2 | 5/2008 | Feng et al. | |
| 2005/0174803 A1 * | 8/2005 | Hayashi et al. | 362/608 |

FOREIGN PATENT DOCUMENTS

| | | |
|---|---|---|
| JP | 2002-042534 A | 2/2002 |
| JP | 2003-331629 A | 11/2003 |
| JP | 2004-171788 A | 6/2004 |
| JP | 2006-004645 A | 1/2006 |
| JP | 2006-049192 A | 2/2006 |
| JP | 2006-059559 A | 3/2006 |
| JP | 2006114503 A | 4/2006 |
| JP | 2006-185852 A | 7/2006 |
| KR | 1020060087143 A | 2/2006 |

* cited by examiner

*Primary Examiner* — Huyen Ngo

(74) *Attorney, Agent, or Firm* — K&L Gates LLP

(57) ABSTRACT

An illumination system includes: a light source that emits light; and a light guide that introduces the light through a light-incident end face facing the light source and that lets out the light from a light-exiting surface adjacent to the light-incident end face. The light source is disposed adjacent to the light-incident end face and in the position shifted from the center of the width of the light guide intersecting the direction in which the light source emits light. The light-incident end face of the light guide has at least one projection or recess in the direction intersecting the light-exiting direction of the light source. The projection or recess has an asymmetrical shape inclined in the direction intersecting the light-exiting direction of the light source. The projection or recess is inclined in one of directions intersecting the light-exiting direction of the light source.

10 Claims, 12 Drawing Sheets

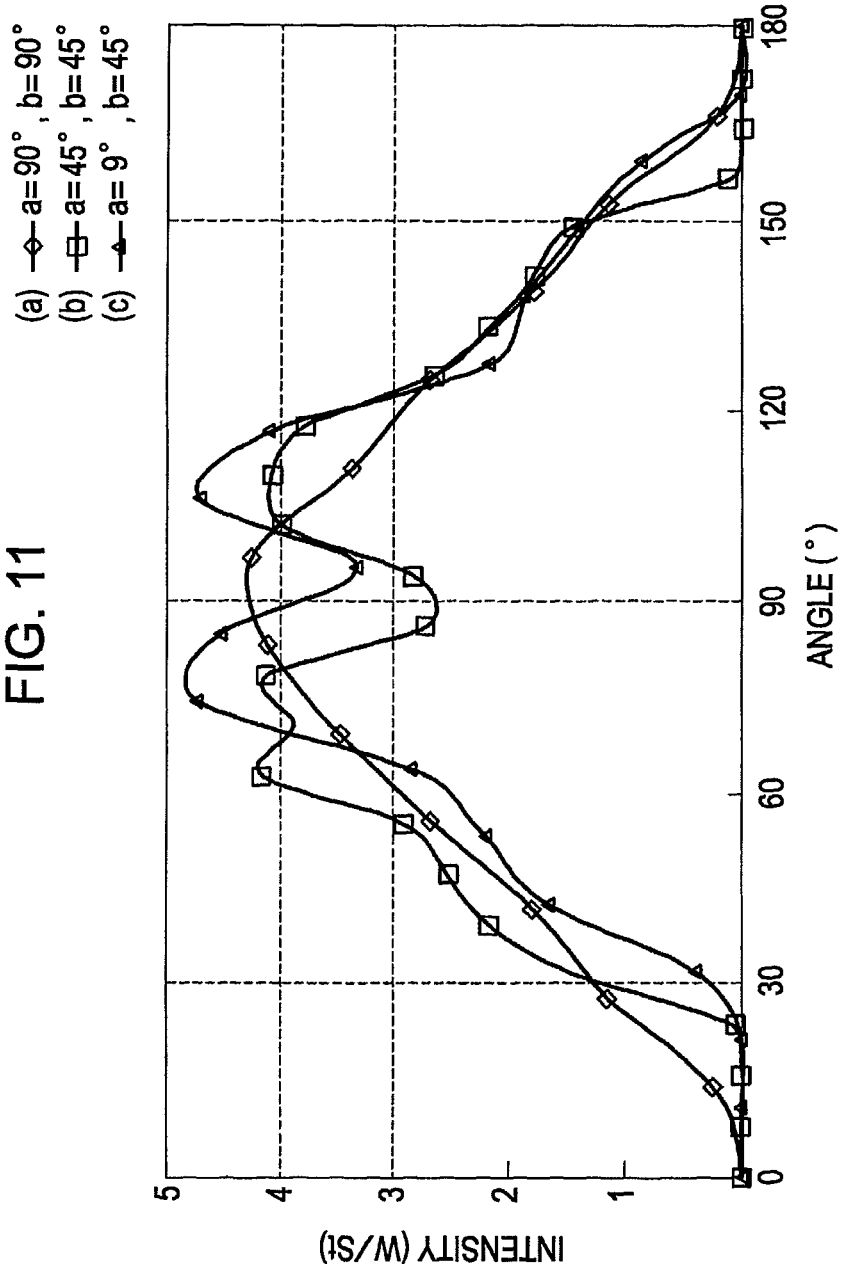

ILLUMINATION SYSTEM, LIQUID CRYSTAL DEVICE, AND ELECTRONIC DEVICE

The entire disclosure of Japanese Patent Application No. 2006-222281, filed Aug. 17, 2006 is expressly incorporated by reference herein.

BACKGROUND

1. Technical Field

The present invention relates to an illumination system for applying light onto an object such as a liquid crystal device, a liquid crystal device incorporating the illumination system, and an electronic device incorporating the liquid crystal device.

2. Related Art

Various electronic devices such as portable phones and personal digital assistants widely use a liquid crystal device as a display for visually displaying various information of the electronic devices. The liquid crystal devices need sun light, room light, or an illumination system because they are not selfluminous devices.

The illumination systems used in liquid crystal devices generally include a light source that emits light and a light guide that converts the light from the light source to planar light and that outputs it. A frequently used light source is a light emitting diode (LED). Light emitted from LEDs may cause light portions and dark portions on the light guide illuminated by the light because of its directivity.

Known illumination systems use a light guide that has a plurality of protrusions or recesses on the light-incident surface (see JP-A-2006-59559, pp. 5-6, FIG. 3, JP-A-2006-49192, p. 5, FIG. 2, and JP-A-2006-4645, p. 4, FIG. 3). Those illumination systems refract light by the protrusions or recesses to diffuse the light to a wide range of the light guide, thereby distributing the light exiting from the light source evenly.

It is desirable that the light source be disposed in a position at which light of even intensity is applied to the widest possible area in the plane of the light guide. However, the light guide cannot always be disposed in a desired location, because liquid crystal devices are composed of various elements. In such a case, the uneven distribution of light incident on the light guide may cause high lighted portions by excessive light and low lighted portions by little light.

FIG. 12A shows an example of known illumination systems. The illumination system, dented at 201, includes a light guide 203 and light sources 202L and 202R. The light-incident end face 203$a$ of the light guide 203 has no evenness. When the two light sources 202L and 202R are placed at positions P$_r$ in the X direction along the width of the light guide 203, light of even intensity can be applied to the widest possible area of the light-exiting surface 203$b$ of the light guide 203. The positions of the light sources 202L and 202R at which light of even intensity can be applied in the widest possible area of the light-exiting surface 203$b$ of the light guide 203 are hereinafter referred to as "reference positions P$_r$". This is not limited to the illumination system 201 of FIG. 12A as long as the light incident end face 203$a$ is planar.

FIG. 12B illustrates the distribution of light emitted from the two light sources 202L and 202R, which are disposed off the reference position P$_r$ closer to each other, and entering the light guide 203. The two light sources 202L and 202R are sometimes disposed off the reference positions P$_r$ because of necessity of the internal structure of an electronic device that incorporate the illumination system 201 as one component.

Referring to FIGS. 12A and 12B, the light emitted from the light sources 202L and 202R enters light radiation areas $\alpha_L$ and $\alpha_R$. The traveling direction of the light (that is, the orientation of the light radiation areas $\alpha_L$ and $\alpha_R$) is substantially perpendicular to the side end face 203$a$ of the light guide 203. In this specification, the traveling direction of the light is sometimes referred to as "the optical axis".

In FIG. 12A, the light sources 202L and 202R are arranged so that the light radiation area $\alpha_L$ of the light emitted from the light source 202L and the light radiation area $\alpha_R$ of the light emitted from the light source 202R are not overlapped. On the other hand, in FIG. 12B, the light radiation areas $\alpha_L$ and $\alpha_R$ are partly overlapped because the interval between the light source 202L and the light source 202R is small. In this case, the luminous intensity may become high in the area β where the light radiation areas $\alpha_L$ and $\alpha_R$ overlap, causing uneven luminous intensity in the plane of the light guide 203.

To solve the above problem, it may be effective to change the traveling direction or the direction of the optical axis of the light incident on the light guide 203 in correspondence with the positions of the light sources 202L and 202R. However, the illumination systems disclosed in JP-A-2006-59559, JP-A-2006-49192, and JP-A-2006-4645 cannot change the direction of the optical axis, although they can diffuse the light incident on the light guide. Thus, the related-art illumination systems cannot prevent the light emitted from different light sources from overlapping in the light guide to cause uneven luminous intensity in the plane of the light guide.

SUMMARY

An advantage of some aspects of the invention is to provide an illumination system that can emit uniform light through the light guide by adjusting the optical axis of the light incident on the light guide according to the position of the light source facing the light guide, and a liquid crystal device and an electronic device incorporating the same.

An illumination system according to a first aspect of the invention includes: a light source that emits light; and a light guide that introduces the light through a light-incident end face facing the light source and that lets out the light from a light-exiting surface adjacent to the light-incident end face. The light source is disposed adjacent to the light-incident end face and in the position shifted from the center of the width of the light guide intersecting the direction in which the light source emits light. The light-incident end face of the light guide has at least one projection or recess in the direction intersecting the light-exiting direction of the light source. The projection or recess has an asymmetrical shape inclined in the direction intersecting the light-exiting direction of the light source. The projection or recess is inclined in one of directions intersecting the light-exiting direction of the light source.

The light source used in this illumination system can radiate light fanwise. The fan-out light has optical directivity of traveling in one direction. The light emitted from the light source is radiated into a specified angle range from the center of the light source. The conductor is a plate-like member made of light-transmissive resin or the like. It is desirable that the light source be disposed at the reference position with respect to the light guide, that is, on the center line of the width of the light guide intersecting the light-exiting direction of the light source and adjacent to the light-incident end face so as to make the luminance of the light exiting from the light guide uniform in the plane of the light guide. However, the light source cannot always be disposed at a desired location because various components of the liquid crystal device are disposed around the illumination system.

The illumination system according to embodiments of the invention has projections or recesses on the light-incident end face of the light guide and in the direction intersecting the light-exiting direction of the light source. The light emitted from the light source and introduced into the light guide through the light-incident end face of the light guide is refracted by the projections or recesses on the light-incident end face. The projections or recesses each have an asymmetrical shape inclined in one of directions intersecting the light-exiting direction of the light source. Thus, most of the light refracted by the projections or recesses can travel in the same direction. Thus, the optical axis of the light that is emitted from the light source and introduced into the light guide can be changed. As a result, even if the light source is disposed off the reference position with respect to the light guide, the light from the light source can be introduced to a desired area in the light guide by changing the optical axis, so that the light exiting from the light guide can be made uniform.

In this case, the projection can refract, in the light guide, the light emitted from the light source in the direction of inclination of the projection; and the recess can refract, in the light guide, the light emitted from the light source in the direction opposite to the direction of inclination of the recess.

Individual light sources illuminate corresponding predetermined areas in the light guide. As described above, the light emitted from the light source is radiated within a predetermined angle from the center of the light emitting section of the light source. Therefore, the reference position of the light source is on the center line of the area in the light guide to be illuminated by the light source. Even if the light source is displaced from the reference position, the optical axis of the light from the light source can be shifted opposite to the side to which the light source shifts by setting the projections or recesses so as to refract the light to the opposite side.

In accordance with embodiments of the invention, the projections can refract the light in the direction of the inclination of the projections. Therefore, the optical axis of the light emitted from the light source can be shifted opposite to the side to which the light source shifts by tilting the projections opposite to the shift side. On the other hand, the recesses can refract the light opposite to the inclination of the recesses. Therefore, the optical axis of the light emitted from the light source can be shifted opposite to the shift side by tilting the recesses to the shift side. Thus, the inclination of the projections or recesses allows compensation of the shift of the radiation area of the light source due to the shift of the light source.

It is preferable that the projection or recess provided on the light-incident end face of the light guide include a plurality of projections or recesses.

It is preferable that there be flat portions between the projections or recesses, and each projection or recess is triangular in shape with respect to the extension of the flat portion. The flat portion between the projections or recesses prevents the light from the light source from refracting so that the light can enter the light-incident end face of the light guide substantially at right angles. Thus the light incident on the light-incident end face at light angles can be provided.

In accordance with embodiments of the invention, each projection or recess can be triangular in shape with respect to the extension of the flat portion. As described above, the projections or recesses are bilaterally asymmetrical in shape. In other words, the shape of the projection or recess is a scalene triangle in which the angles of the both sides formed with the perpendicular from the vertex of the projection or recess to the extension of the flat portion are different. Most of the light incident on this projections or recesses enters the greatly inclined side and is refracted opposite thereto to change in optical axis to the direction of the refraction. Thus the radiation area of the light source is directed in the same direction as the optical axis. Furthermore, the flat portion between the projections or recesses allows a wide area including the front of the light source to be irradiated even if the optical axis is changed at the projections or recesses. That is, the illumination system can illuminate the wide area including the area at right angles to the light-incident end face and the area fanned out opposite to the greatly inclined side.

It is preferable that the relationship between the angles of inclination of the both sides of the projection formed with the perpendicular from the vertex of the projection to the extension of the flat portion, as viewed from the light-exiting surface, be expressed as $$a<b, \qquad (a)$$

where a is the angle of inclination of the one side intersecting the light-exiting direction of the light source and b is the angle of inclination of the other side. With this structure, if we let a be the angle of inclination of the side opposite to the side to which the light source is shifted from the reference position and let b be the angle of inclination of the other side, most of the light incident on the light guide through the projections can be refracted opposite to the side to which the light source is shifted. Thus, the optical axis of the light introduced to the light guide through the light-incident end face can be changed to the direction opposite to the shift side. This can prevent the luminous intensity on the shift side from increasing to make the intensity of the light exiting from the light guide uniform.

It is preferable that the relationship between the angles of the both sides of the recess formed with the perpendicular from the base vertex of the recess to the extension of the flat portion, as viewed from the light-exiting surface, be expressed as $$c>d, \qquad (a)$$

where c is the angle of inclination of the one side intersecting the light-exiting direction of the light source and d is the angle of inclination of the other side. With this structure, if we let d be the angle of inclination of the side to which the light source is shifted from the reference position and let c be the angle of inclination of the other side, most of the light incident on the light guide through the recesses can be refracted opposite to the side to which the light source is shifted from a predetermined position. Thus, the optical axis of the light introduced to the light guide through the light-incident end face can be changed to the direction opposite to the side to which the light source is shifted. This can prevent the luminous intensity on the shift side from increasing to make the intensity of the light exiting from the light guide uniform.

It is preferable that the projection or recess have two sides in the direction intersecting the light-exiting direction of the light source, wherein the one side be straight and the other side be curved, and wherein there be no flat portion between the projections or the recesses. This illumination system is constructed such that the sides of the projections or recesses for refracting the incident light are curved and the opposite sides are straight. The curved side can refract the incident light. Of the curved sides, the portion whose tangent is parallel to or nearly parallel to the light-incident side face of the light guide can hardly refract light, and thus the light enters the light-incident side face substantially at right angles. That is, this portion offers the same effect as the flat portion. Furthermore, curving the sides of the projections increases the width of the tips of the projections, thereby ensuring mechanical strength of the projections.

An illumination system according to a second aspect of the invention includes: a light source that emits light; and a light guide that introduces the light through a light-incident end face facing the light source and that lets out the light from a light-exiting surface adjacent to the light-incident end face. The light source is disposed adjacent to the light-incident end face and on both sides of the center line that divides the light-exiting surface of the light guide equally in the light-exiting direction of the light source. The light source is disposed so as to face the light-incident end face in the position shifted from the center between the center line and the end face parallel to the center line. The light-incident end face of the light guide has a projection or recess in the direction intersecting the light-exiting direction of the light source. The projection or recess has an asymmetrical shape inclined in the direction intersecting the light-exiting direction of the light source. The projection refracts the light in the direction of inclination intersecting the light-exiting direction, and the recess refracts the light in the direction opposite to the direction of inclination intersecting the light-exiting direction. The projection or recess is inclined in one of directions intersecting the light-exiting direction.

In this case, the projections can refract the light in the direction of the inclination of the projections. Therefore, the optical axis of the light emitted from the light sources can be shifted opposite to the side to which the light is shifted from the reference position by tilting the projections opposite to the shift side. On the other hand, the recesses can refract the light opposite to the inclination of the recesses. Therefore, the optical axis of the light emitted from the light source can be shifted opposite to the shift side by tilting the recesses to the shift side. Thus, the inclination of the projections or recesses allows compensation of the shift of the radiation area of the light source due to the shift of the light source.

If the light sources disposed on both sides of the center line of the light guide are shifted close to each other, the light in the plane of the light guide can be prevented from extremely increasing in intensity by changing the optical axis so as to prevent the respective illumination area of the light sources from overlapping. If the light sources are disposed apart from each other, the light in the plane of the light guide can be prevented from extremely decreasing in intensity by changing the optical axis so that the fan-out radiation area is directed between the light sources. Thus, the intensity of the light exiting from the light guide can be made uniform in both cases.

A liquid crystal device according to a third aspect of the invention includes: a liquid crystal panel having a liquid crystal layer and a polarizing layer that agrees with the liquid crystal layer in plan view; and an illumination system that applies light onto the liquid crystal panel. The illumination system is the illumination system described above. The illumination system can change the optical axis of the light incident on the light guide with the bilaterally asymmetric protrusions or recesses on the light-incident end face of the light guide and as such, it can make the luminous intensity of the light exiting from the light guide uniform in the plane. Thus, the intensity of the emitted from the illumination system of the liquid crystal device can be made uniform. Accordingly, the luminance of the display of the liquid crystal device can also be made uniform.

An electronic device according to a fourth aspect of the invention includes the liquid crystal device described above. The liquid crystal device can change the optical axis of the light incident on the light guide since the light-incident end face of the light guide of the illumination system has bilaterally asymmetric protrusions or recesses and as such, it can make the intensity of the light exiting from the light guide uniform in the plane. Thus, the luminance of the display of the liquid crystal device can be made uniform. Accordingly, the luminance of the display of the electronic device can also be made uniform.

BRIEF DESCRIPTION OF THE DRAWINGS

The invention will be described with reference to the accompanying drawings, wherein like numbers reference like elements.

FIG. 11 shows graphs of the results of a simulation performed for the illumination system according to an embodiment of the invention.

DESCRIPTION OF EXEMPLARY EMBODIMENTS

First Embodiment of Illumination System and Liquid Crystal Device

An illumination system according to an embodiment of the invention applied to a liquid crystal device will be described. It should be understood that the following embodiments are examples of the invention and do not limit the invention. The accompanying drawings referred to as necessary show the components in relative size different from actual size to make important components easier to understand.

Figure 1:
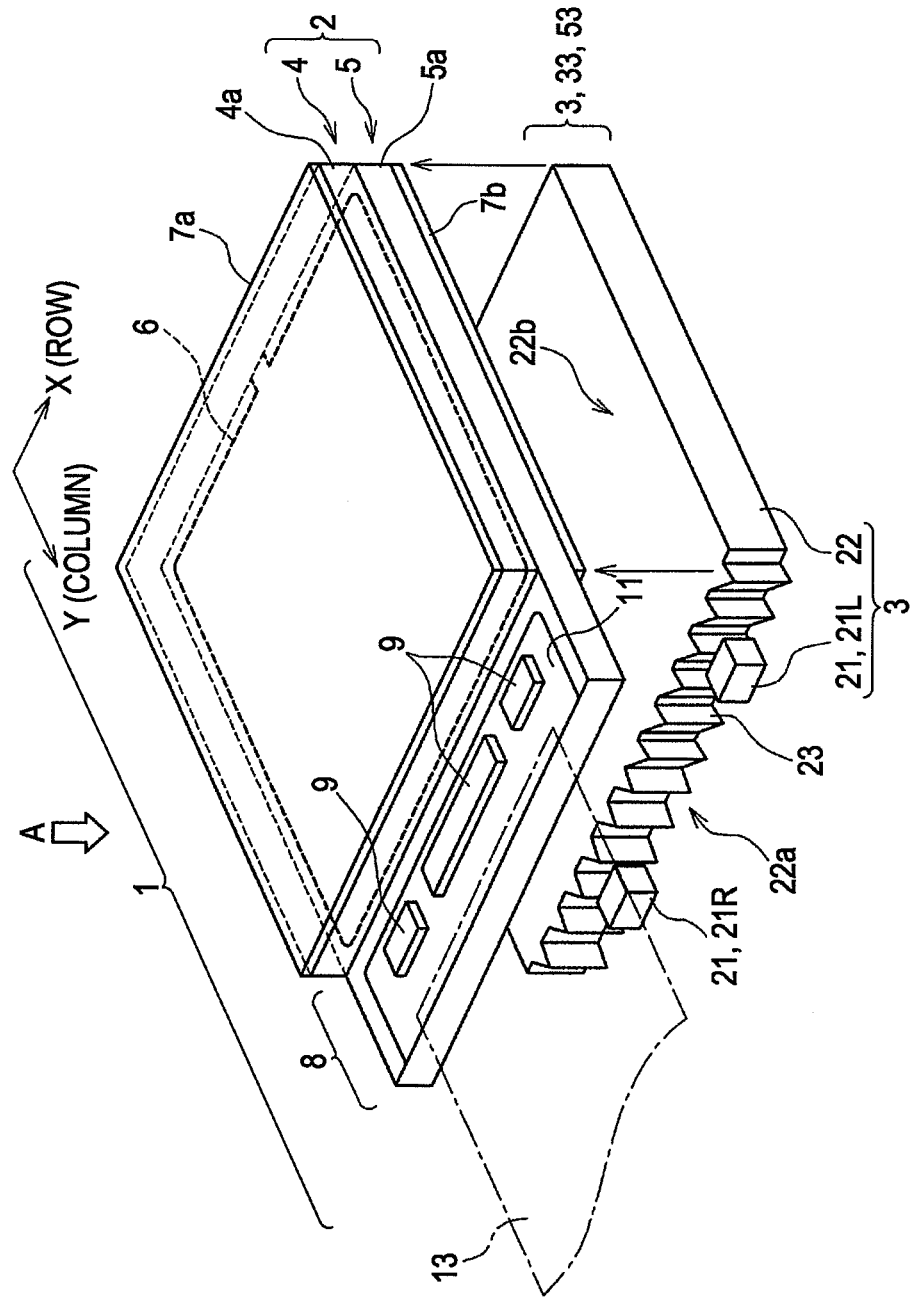
FIG. 1 is an exploded view of an illumination system and a liquid crystal device according to an embodiment of the invention.
Figure 2:
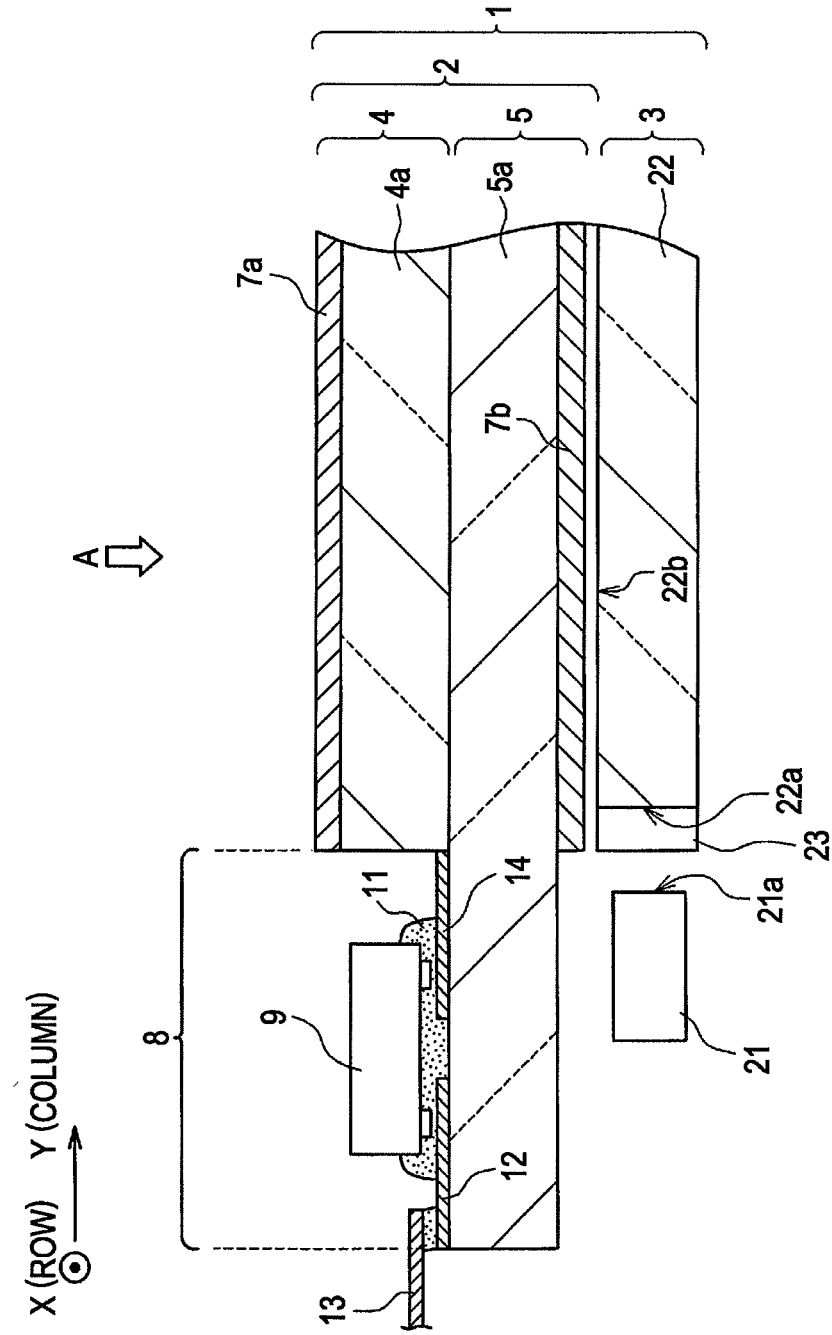
FIG. 2 is a cross sectional view of essential parts of the liquid crystal device of FIG. 1.

FIG. 1 is an exploded view of a liquid crystal device according to an embodiment of the invention. FIG. 2 is a cross sectional view of essential parts of the liquid crystal device of FIG. 1 in an assembled state. Referring to FIG. 1, the liquid crystal device 1 includes a liquid crystal panel 2, or an electrooptical panel, and an illumination system 3. The liquid crystal device 1 is viewed from the side indicated by arrow A.

The liquid crystal panel 2 has a first substrate 4 and a second substrate 5 opposed thereto, which are bonded together with a seal member 6 in the shape of a square or rectangular frame as viewed from the direction indicated by the arrow A. There is a gap, or a so-called cell gap, between the first substrate 4 and the second substrate 5, in which liquid crystal, or an electrooptical material, is sealed to form a liquid crystal layer.

The first substrate 4 has a first light-transmissive substrate 4a which is square or rectangular as viewed from the direction indicated by the arrow A. The first light-transmissive substrate 4a is made of light-transmissive glass, plastic or the like. As shown in FIG. 2, a polarizer 7a is bonded to the outer surface of the first light-transmissive substrate 4a. The first substrate 4 may include other appropriate optical elements as necessary.

Referring to FIG. 1, the second substrate 5 opposed to the first substrate 4 has a second light-transmissive substrate 5a which is square or rectangular as viewed from the direction indicated by the arrow A. The second light-transmissive substrate 5a is made of light-transmissive glass, plastic or the like. As shown in FIG. 2, a polarizer 7b is bonded to the outer surface of the second light-transmissive substrate 5a. The second substrate 5 may include other appropriate optical elements as necessary.

The liquid crystal panel 2 may be constructed in any display mode. For example, in terms of the system of driving the liquid crystal, either of a simple matrix or an active matrix may be adopted. In terms of the type of liquid crystal, any of a twisted nematic (TN) mode, a super twisted nematic (STN) mode, a vertical alignment mode, and another alignment mode can be adopted. In terms of the system of lighting, a transmissive type or a semitransmissive type can be adopted because the embodiment uses the illumination system 3 as a back light. If the illumination system 3 is used as a front light, a reflective type is used for lighting.

The simple matrix is a matrix in which each pixel has no active element and the intersections between the scanning electrodes and the data electrodes correspond to pixels or dots, to which a driving signal is applied directly. The simple-matrix liquid crystal adopts TN or STN mode. The active matrix is a matrix in which each pixel or dot is provided with an active element, which is turned on during a writing period to write data voltage, and is turned off during the other period to hold the voltage. Examples of the active element for use in this system are of a three terminal type and a two terminal type. An example of the three-terminal active element is a thin film transistor (TFT). An example of the two-terminal active element is a thin film diode (TFD).

For color display, the liquid crystal panel 2 is provided with a color filter on the first substrate 4 or the second substrate 5. The color filter is a filter that selectively transmits light of a specified wave length. Specifically, colors of red (R), green (G), and blue (B) are arranged on the first substrate 4 or the second substrate 5 in correspondence with the dots and in a specified arrangement, such as a stripe arrangement, a delta arrangement, or a mosaic arrangement.

The second light-transmissive substrate 5a of the second substrate 5 has an overhanging section 8 overhanging outward from the opposing first substrate 4. Mounted on the surface of the overhanging section 8 adjacent to the first substrate 4 are driving ICs 9 by a chip-on-glass (COG) technique using an anisotropic conductive film (ACF) 11. In this embodiment, the number of the driving ICs 9 is three, as shown in FIG. 1. The driving ICs 9 output scanning signals and data signals to the electrodes in the liquid crystal panel 2 to drive the liquid crystal panel 2.

The end of the overhanging section 8 has external connection terminals 12, as shown in FIG. 2. The external connection terminals 12 are disposed at intervals in the direction perpendicular to the sheet paper (that is, in the row direction X). The external connection terminals 12 are connected to the input terminals, e.g., input bumps, of the driving ICs 9. The external connection terminals 12 are connected to a wiring board 13 indicated by the chain line in FIG. 1 with, e.g., the ACF 11. An example of the wiring board 13 is a flexible printed circuit (FPC). The wiring board 13 and the external connection terminals 12 may be connected together by conductive connection such as soldering or heat sealing.

Referring to FIG. 2, the portion of the overhanging section 8 adjacent to the liquid crystal layer is provided with wires 14. The wires 14 are disposed at intervals in the direction perpendicular to the sheet paper (that is, in the row direction X). The wires 14 are connected to the output terminals, e.g., output bumps, of the driving ICs 9. The wires 14 extend to the interior of the liquid crystal panel 2, that is, to the liquid crystal layer, and in the case of the simple matrix type, they are connected to the scanning electrodes and the data electrodes, and for the active matrix type, they are connected to active elements such as TFD elements or TFT elements and to electrodes.

As shown in FIG. 1, the illumination system 3 includes light emitting diodes (LEDs) 21 serving as light sources and a light guide 22 that introduces the light from the LEDs 21 inward and let it out to the liquid crystal panel 2 as planar light. The illumination system 3 of this embodiment is disposed on the back of the liquid crystal panel 2 as viewed from the viewer's side indicated by the arrow A, and functions as a back light. The illumination system 3 of this embodiment executes lighting using two LEDs 21.

The light guide 22 has a light-incident surface 22a which is a light-incident end face and a light-exiting surface 22b which is a light-exiting plane adjacent to the light-incident surface 22a. The light-incident surface 22a is a plane through which the light from the LEDs 21 is introduced into the light guide 22. The light-exiting surface 22b is a plane through which the light from the light-incident surface 22a exits as planer light. The light-exiting surface 22b and the surface of the second substrate 5 facing the light-exiting surface 22b may have an optical sheet (not shown) such as a reflecting sheet, a diffusion sheet, or a prism sheet as needed. The light guide 22 can be formed of light-transmissive resin such as acryl or polycarbonate by molding. The illumination system 3 will be described later in detail.

With this liquid crystal device 1 of this embodiment, referring to FIG. 2, when the LEDs 21 emit light, the light passes through the light-incident surface 22a at the side end of the light guide 22 and is introduced into the light guide 22. The introduced light travels in the light guide 22 and exits from the light-exiting surface 22b next to the side end as planar light, and is applied to the liquid crystal panel 2. While the light is fed to the liquid crystal panel 2, the voltage applied to the liquid crystal layer in the liquid crystal panel 2 is controlled for each pixel, so that the orientation of the liquid crystal molecules is controlled for each pixel. The light fed to the liquid crystal panel 2 is modulated for each pixel by the action of the aligned liquid crystal molecules. The passage of the modulated light through the polarizer 7a of the first substrate 4 is controlled for each pixel by the polarizing characteristic of the polarizer 7a. Thus, images such as characters, numerals, or figures are displayed on the surface of the first substrate 4, and are viewed from the direction of the arrow A.

Planar light exits from the light-exiting surface 22b of the light guide 22 to the liquid crystal panel 2, as described above.

The display quality of the liquid crystal panel 2 greatly depends on the characteristics of the light exiting from the light guide 22. For example, unless uniform planar light exits from the light-exiting surface 22b of the light guide 22, the luminance in the display area of the liquid crystal panel 2 varies to make the display hard to watch. To make the luminance of light exiting from the light-exiting surface 22b of the light guide 22 uniform, the embodiment adopts the following technique. The technique ensures uniform luminance even if the LEDs 21 serving as light sources are displaced from predetermined positions.

The illumination system 3 of this embodiment will be described in detail.

Figure 3:
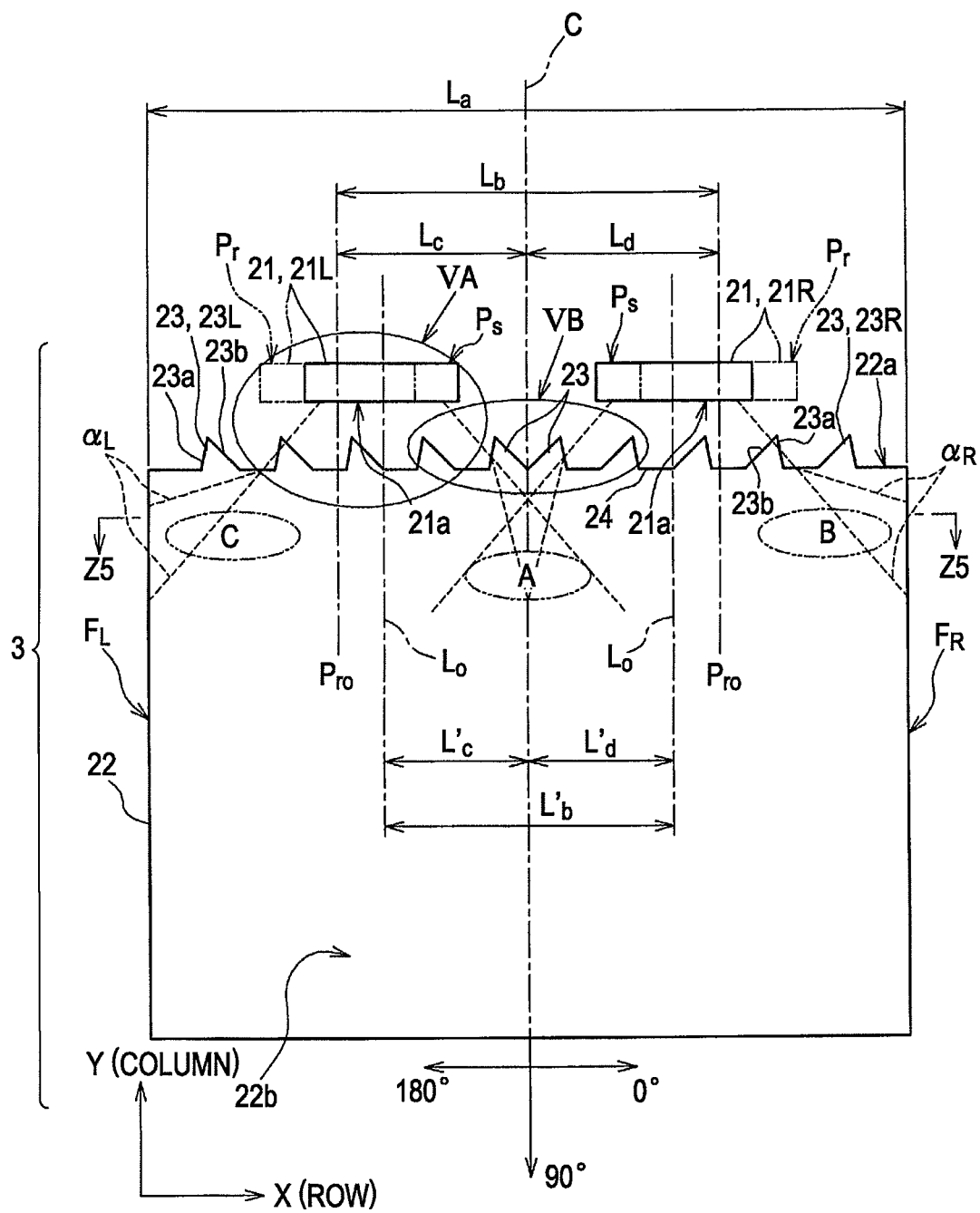
FIG. 3 is a plan view of the illumination system of FIG. 1 as viewed from the direction of the arrow A.
Figure 4:
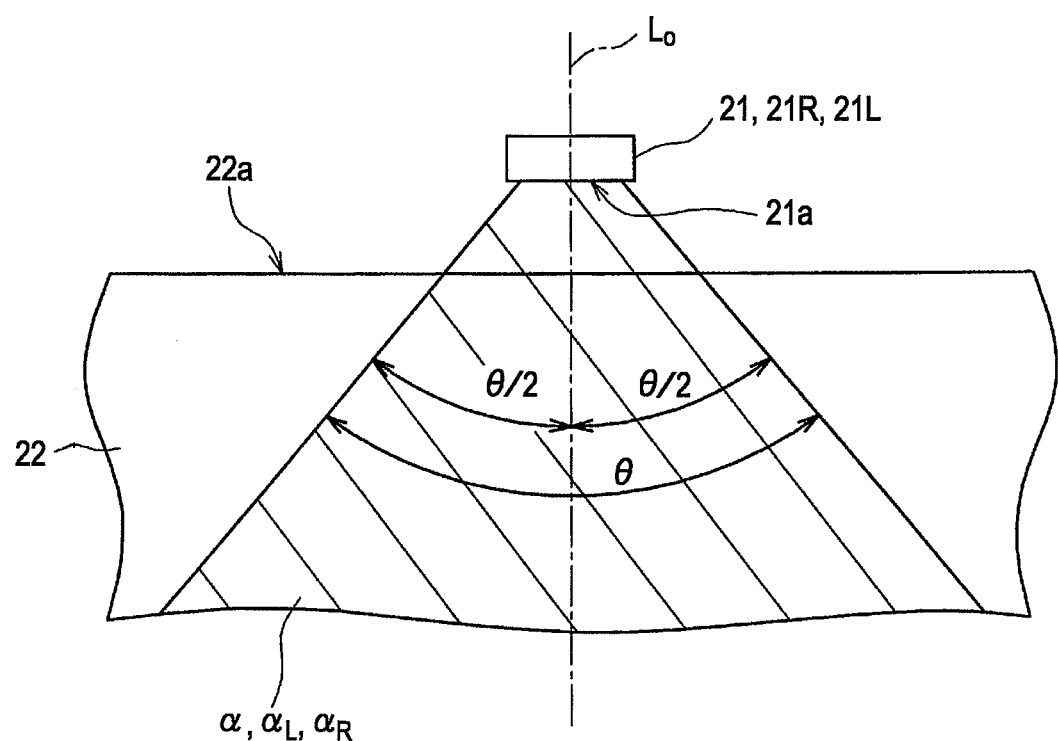
FIG. 4 is a plan view of the radiation area of the light source.
Figure 5A:
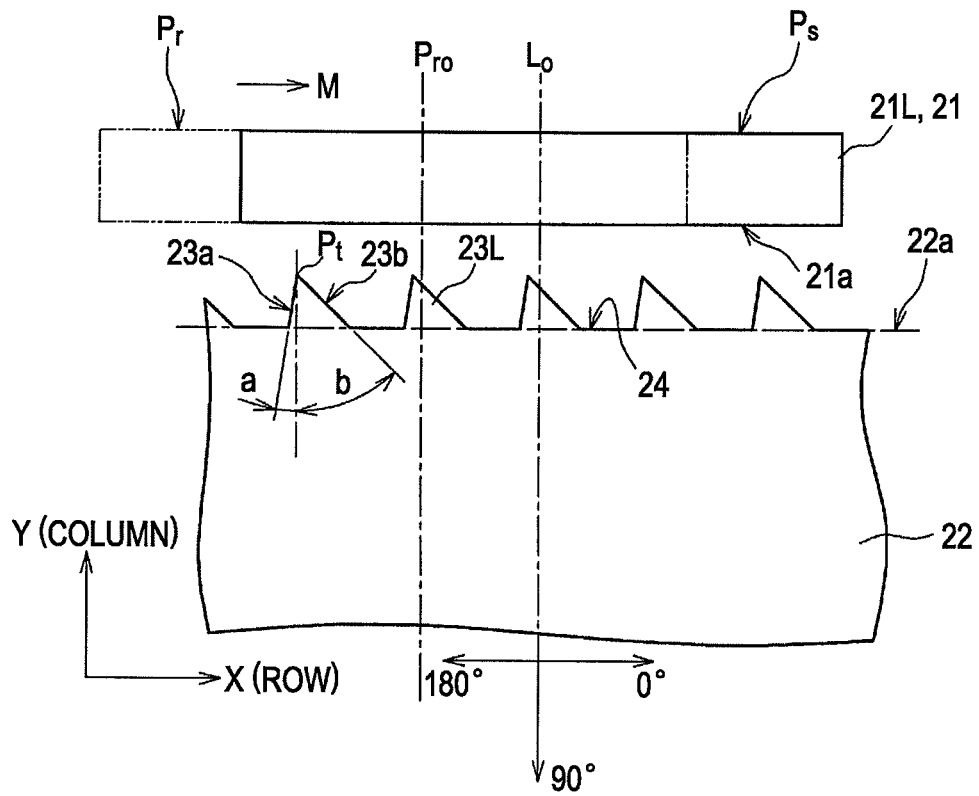
FIG. 5A is a plan view of essential parts of the illumination system of FIG. 3, showing the portion indicated by arrow Z1.
Figure 5B:
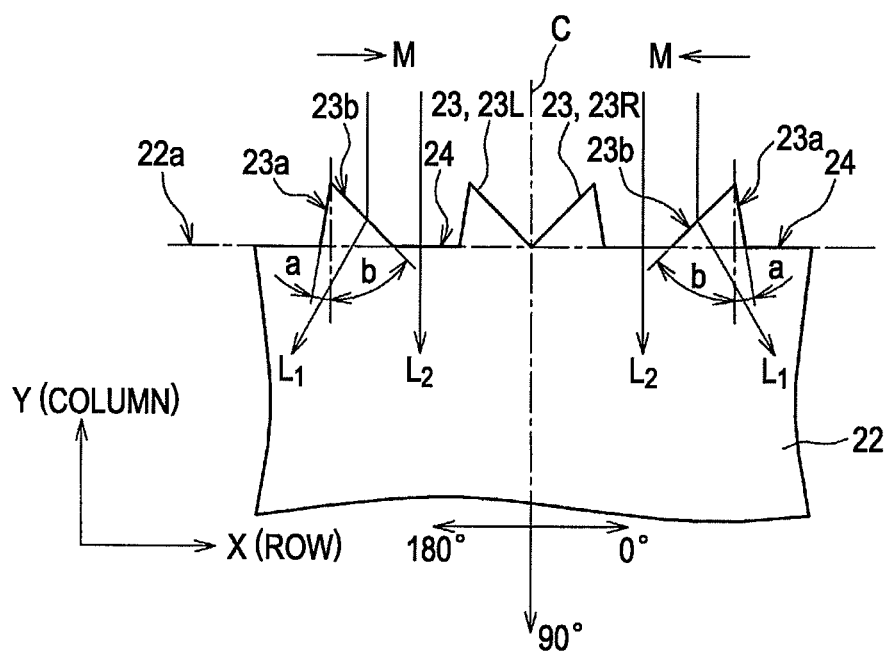
FIG. 5B is a plan view of essential parts of the illumination system of FIG. 3, showing the portion indicated by arrow Z2.

FIG. 3 is a plan view of the illumination system 3 in FIG. 1 as viewed from the direction of the arrow A. FIG. 4 is a diagram illustrating the light radiation area of the light from the LED 21. FIG. 5A is an enlarged view of the portion indicated by arrow Z1 in FIG. 3, that is, one LED 21 and the light-incident surface 22a facing it. FIG. 5B is an enlarged view of the portion indicated by arrow Z2 in FIG. 3, that is, the central portion of the light-incident surface 22a in the direction of the width.

Referring to FIG. 3, the illumination system 3 includes two LEDs 21 serving as light sources and the light guide 22. The light guide 22 has the light-incident surface 22a which is a side end face and the light-exiting surface 22b which is adjacent to the light-incident surface 22a. The light guide 22 can be formed of light-transmissive resin such as acryl or polycarbonate by molding. The surface of the light-incident surface 22a has a plurality of protrusions 23 with a flat portion 24 therebetween.

The LEDs 21 are light sources having a specific light radiation angle and so having light directivity to direct light along the optical axis. Specifically, as shown in FIG. 4, the light from the LED 21 radiates or is fanned out at angle θ. The angle θ is the radiation angle. The area α within the radiation angle θ is the light radiation area of the LED 21. The light radiation area α0 is symmetrical about the center line $L_o$ of the light-emitting section of the LED 21. In other words, the light exit angles on the right and left of the center line $L_o$ of the light-emitting section is θ/2. Thus, the light emitted from the LED 21 is fanned out radially. The traveling direction of the radial light, that is, the direction of the optical axis, is along the center line $L_o$ of the light-emitting section and at right angles to the light-incident surface 22a. In FIG. 4, the protrusions 23 are not shown.

Referring to FIG. 2, the light-emitting section 21a of the LED 21 is opposed to the light-incident surface 22a of the light guide 22. As shown in FIG. 1, two LEDs 21 are arranged at an interval along the width of the light-incident surface 22a (in the row direction X). Specifically, referring to FIG. 3, the LEDs 21 are arranged on the right and left of the center line C of the light guide 22 in the direction of the width. The center line C of the light guide 22 is a line that is orthogonal to the light-incident surface 22a of the light guide 22 to divide the light-exiting surface 22b in the direction of the width. The LED disposed on the left of the center line C is denoted by 21L, and the LED disposed on the right of the center line C is denoted by 21R.

A known illumination system will be described for the sake of comparison. The known illumination system have no protrusions 23 on the light-incident surface 22a of the light guide 22, that is, the light-incident surface 22a is flat, unlike that of FIG. 3. In the case of the flat light-incident surface 22a, the right and left LEDs 21 are disposed at the reference positions indicated by the chain double-dashed lines $P_r$. Let $L_a$ be the whole width of the light guide 22, let $L_b$ be the distance between the center lines $P_{ro}$ of the right and left reference positions $P_r$, let $L_c$ be the distance between the center line C and the center line $P_{ro}$ of the left reference position $P_r$, and let $L_d$ be the distance between the center line C and the center line $P_{ro}$ of the right reference position $P_r$, their relation is expressed as follows:

$$L_b = L_a/2, L_c = L_d = L_a/4.$$

That is, the reference position $P_r$ is set in the center of the half area of the light guide 22 divided by the center line C. The LEDs 21R and 21L apply light to the respective half areas of the light guide 22. Thus, the known illumination system having the flat light-incident surface 22a has a structure in which the LEDs 21R and 21L are disposed at the center of the half area of the light guide 22, as described above, so as to apply light of a uniform intensity to a wide area, preferably, almost the whole of the half area.

In contrast to the known illumination system, the right and left LEDs 21R and 21L of the illumination system 3 of this embodiment are disposed in positions $P_s$ indicated by the solid lines inside the reference positions $P_r$ (that is, closer to the center line C). This is because the LEDs 21R and 21L cannot be placed in the reference positions $P_r$ because of the internal structure of a device, e.g., a liquid crystal device, to which the illumination system 3 is incorporated. That is, the LEDs 21R and 21L of this embodiment are disposed off the reference positions $P_r$ in the row direction X.

In this case, $$L_b' = L_a/2, L_c' = L_d' < L_a/4 \text{ holds},$$

where $L_c'$ and $L_d'$ are the distances between the center lines $L_o$ of the LEDs 21R and 21L and the center line C, respectively, and $L_b'$ is the distance between the center lines $C_o$ of the LEDs 21R and 21L.

The plurality of protrusions 23 provided on the light-incident surface 22a of the light guide 22 is classified into protrusions 23L on the left of the center line C and protrusions 23R on the right of the center line C. The left protrusions 23L receive the light from the LED 21L, and the right protrusions 23R receive the light from the right LED 21R. Each of the protrusions 23 is bilaterally asymmetrical in cross section. Specifically, the protrusions 23 have different triangular cross sections whose angles of inclination on the right and left of the perpendicular from the vertex to the light-incident surface 22a are different. Between the protrusions 23 except the central protrusion 23 are provided a flat portion 24. The flat portion 24 is parallel to the light-emitting section 21a of the LED 21.

The cross section of each of the protrusion 23L on the left of the center line C and the cross section of each of the protrusions 23R on the right of the center line C are axisymmetrical or mirror symmetrical about the center line C. The orientations of the cross sections of the protrusions 23 on the same side are the same.

FIG. 5A is an enlarged view of the portion on the left of the center line C. The shape of each protrusion 23 will be specifically described with reference to the drawing. Referring to FIG. 3, the protrusions 23R on the right of the center line C are the same in shape as the protrusions 23L on the left except that they are axisymmetrical. Referring to FIG. 5A, let a be the angle between the left side of each protrusion 23L and the perpendicular from the vertex $P_t$ of the protrusion 23L to the light-incident surface 22a (that is, the extension of the flat portion 24), and let b be the angle between the right side of the protrusion 23L and the perpendicular from the vertex $P_t$ of the protrusion 23L to the light-incident surface 22a, $$a < b \text{ holds}.$$

Preferably, a is set at 9° and b is set at 45°.

The left side 23a of the protrusion 23L is opposite to the direction in which the LED 21L shifts from the reference position $P_r$ (indicated by the arrow M). The right side 23b of the protrusion 23L is on the same side as the LED 21L shifts from the reference position $P_r$. Referring to FIG. 3, the direction in which the LED 21R on the right of the center line C shifts from the reference position $P_r$ is opposite to the LED 21L on the left side. Thus, the cross section of the right-side protrusions 23R is opposite to that of the left-side protrusions 23L. Specifically, as shown in FIG. 5B, a is the angle of the side 23a opposite to the direction M in which the LED shifts (hereinafter, referred to as an LED shift direction M) formed with the perpendicular from the vertex $P_t$ of the protrusion 23R, and b is the angle of the side 23b on the same side as the LED 21L formed with the perpendicular from the vertex $P_t$.

It is desirable for the illumination system that the LED be disposed in the position at which light of uniform intensity can be applied to the widest possible area of the light-exiting plane of the light guide. If the light-incident surface is flat, this position is the reference position $P_r$ shown in FIG. 3. However, the light source cannot always be disposed at a desired location because liquid crystal devices have various components.

For example, as in the embodiment shown in FIG. 3, the LEDs 21R and 21L are disposed in the position shifted close to the center line C. In this case, if the optical axes of the LEDs 21R and 21L are perpendicular to the light-incident surface 22a of the light guide 22, without protrusions or recesses as in the known art, the distribution of light incident on the light guide 22 will become uneven. Specifically, the light emitted from the LED 21L into the radial radiation area $α_L$ and the light emitted from the LED 21R into the radial radiation area $α_R$ overlap in the central area A of the light guide 22. Thus, the luminous intensity at the overlapped portion becomes higher than the area B close to the right end face $F_R$ of the light guide 22 and the area C close to the left end face $F_L$. This sometimes makes the luminous intensity uneven in the plane of the light guide 22, and thus makes the intensity of the light exiting from the light-exiting surface 22b uneven.

In contrast, in this embodiment, referring to FIG. 3, the light-incident surface 22a of the light guide 22 has the multiple protrusions 23 bilaterally symmetrical in cross section so as to change the optical axis of the light emitted from the LED 21. Specifically, the protrusions 23L are provided on the left of the center line C, and the protrusions 23R are provided on the right. As shown in FIG. 5A, the protrusions 23L are triangular in cross section in which the angle of inclination b of the side 23b and the angle of inclination a of the side 23a has the relation a<b. Thus, as shown in FIG. 5B, most of the light incident on the light-incident surface 22a on the left of the center line C is refracted to the left (toward the left end face $F_L$ of FIG. 3), as indicated by the arrow L1 by the greatly angled side 23b of the protrusion 23L. Thus, the light radiation area $α_L$, that is the optical axis, can be changed from the direction of 90° from 0 o'clock to 6 o'clock (in the column direction Y) to the direction of 180° from 3 o'clock to 9 o'clock (in the row direction X), as indicated by the broken lines in FIG. 3. This increases the amount of light traveling to the area C in the light guide 22.

On the other hand, referring to FIG. 5A, the protrusions 23R on the right are triangular in cross section in which the angle of inclination b of the side 23b and the angle of inclination a of the side 23a has the relation a<b. Thus, as shown in FIG. 5B, most of the light incident on the light-incident surface 22a on the right of the center line C is refracted to the right (toward the right end face $F_R$ of FIG. 3) by the shift side 23b of the protrusion 23R, as indicated by the arrow L1. Thus, the light radiation area $α_R$, that is the optical axis, can be changed from the direction of 90° from 0 o'clock to 6 o'clock (in the column direction Y) to the direction of 0° from 9 o'clock to 3 o'clock (in the row direction X), as indicated by the broken lines in FIG. 3. This increases the amount of light traveling to the area B in the light guide 22.

Thus, changing the direction of the optical axes of the light emitted from the LEDs 21L and 21R prevents the light emitted from the two LEDs 21R and 21L from overlapping at the central area A in the light guide 22. The light traveling to the area A is decreased because the light is refracted by the protrusions 23. However, the flat portions 24 disposed between adjacent protrusions 23 allow light to pass therethrough toward the perpendicular from the flat portions 24 to the light guide 22 (the light indicated by the arrow L2 in FIG. 5B). This makes the intensity of the light applied to the light-exiting surface 22b of the light guide 22 uniform and thus makes the intensity of the light exiting from the light-exiting surface 22b uniform.

Second Embodiment of Illumination System and Liquid Crystal Device

Figure 6:
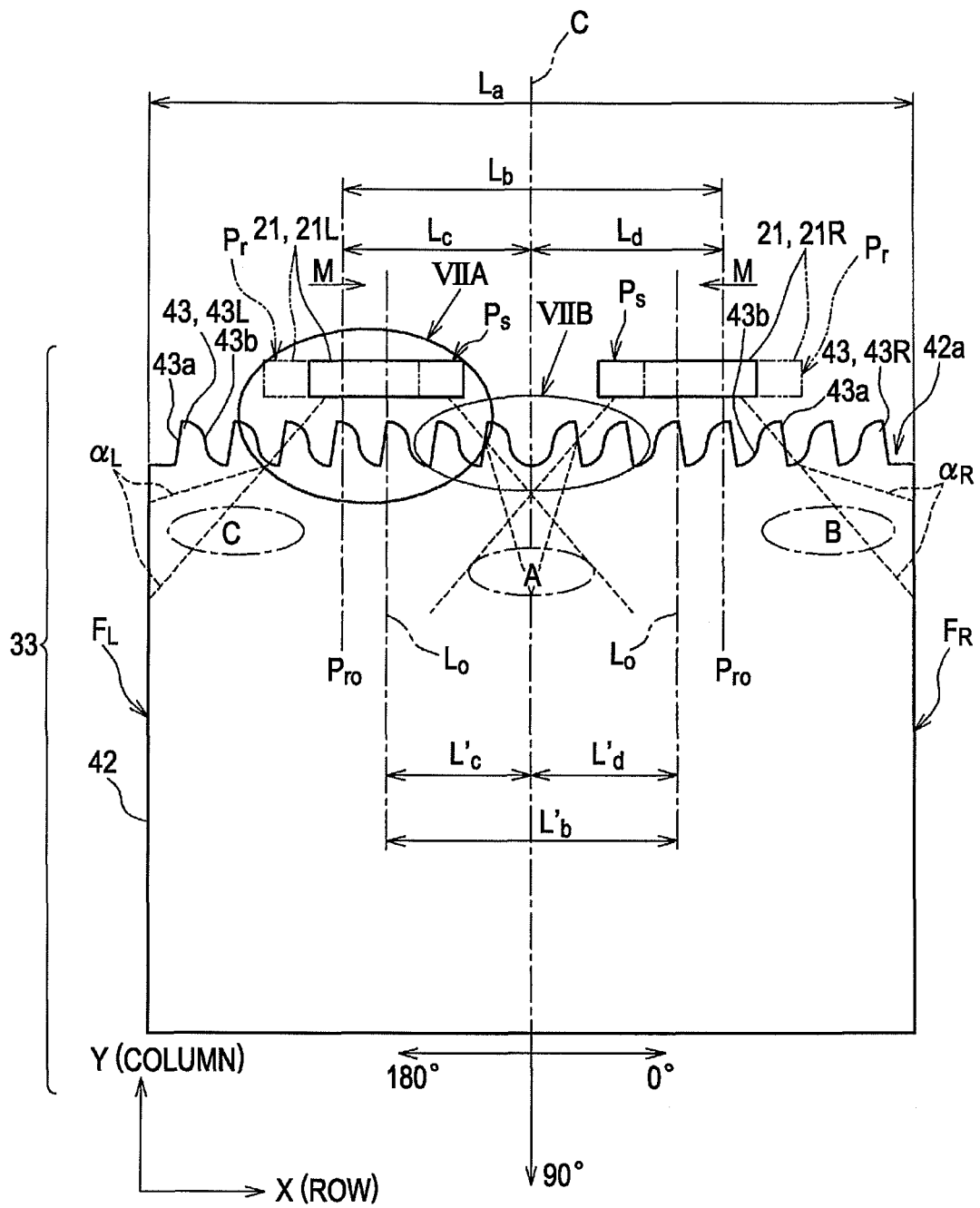
FIG. 6 is a plan view of an illumination system according to another embodiment of the invention.
Figure 7A:
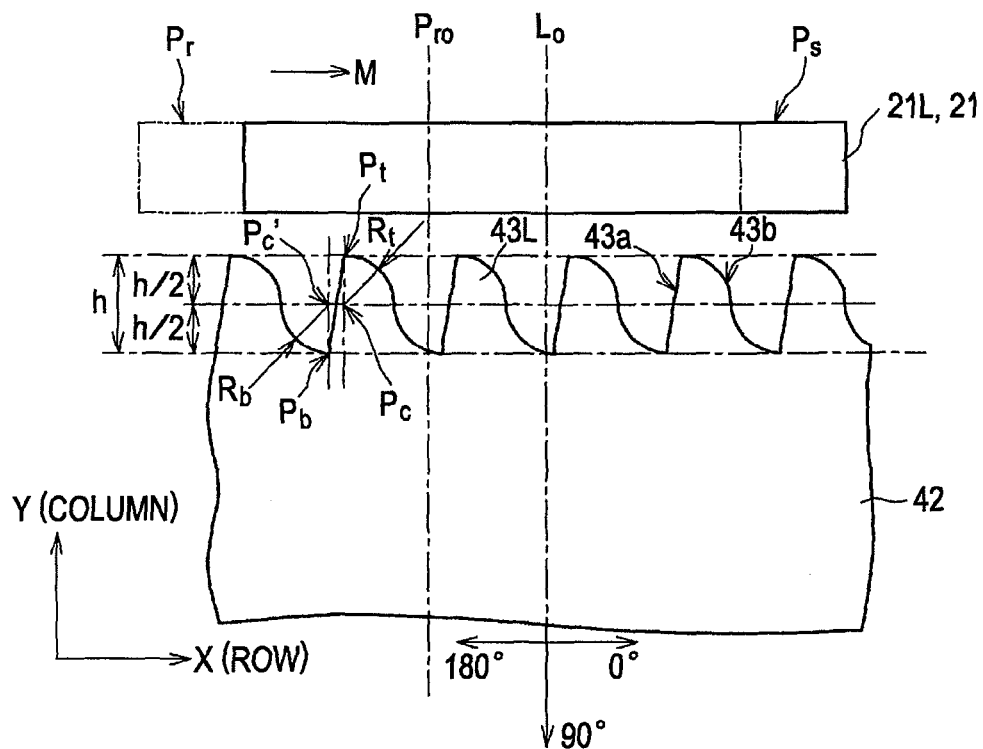
FIG. 7A is a plan view of essential parts of the illumination system of FIG. 6, showing the portion indicated by arrow Z3.
Figure 7B:
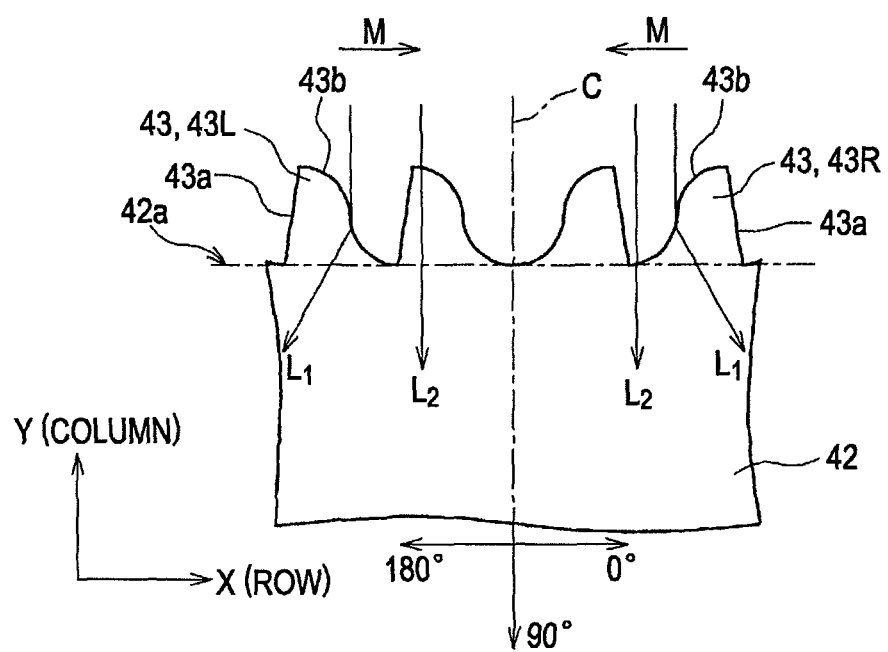
FIG. 7B is a plan view of essential parts of the illumination system of FIG. 6, showing the portion indicated by arrow Z4.

An illumination system and a liquid crystal device according to another embodiment of the invention will be described. The overall structure of the liquid crystal device according to this embodiment is substantially the same as that of the liquid crystal device 1 shown in FIG. 1 except the structure of the light-incident surface of the light guide. This embodiment adopts projections of different shape in place of the protrusions 23 of FIG. 3. FIG. 6 is a plan view of an illumination system 33 according to this embodiment, which is an essential part of the liquid crystal device 1 of FIG. 1, as viewed from the direction of the arrow A. FIG. 7A is an enlarged view of the portion indicated by the arrow Z3 of FIG. 6. FIG. 7B is an enlarged view of the portion indicated by the arrow Z4 of FIG. 6. This embodiment shown in FIG. 6 has the same components as the first embodiment shown in FIG. 3, wherein like reference numerals designate like or corresponding components throughout, and descriptions thereof will be omitted.

Referring to FIG. 6, the illumination system 33 has a plurality of projections 43 on the light-incident surface 42a of a light guide 42. The projections 43 are bilaterally asymmetrical in cross section, wherein one side is straight and the other side is curved. Specifically, referring to FIG. 7A, a side 43a opposite to the direction (arrow M) in which the LED 21 is shifted from the reference position $P_r$ is straight and a side 43b on the side to which the LED 21 is shifted is curved (hereinafter, referred to as an LED-shifted side 43b).

The shape of the projections 43, principally, the shape of the curved portion will be described.

In this embodiment, the sides 43a of the projections 43 shown in FIG. 6 opposite to the direction in which the LED 21 is shifted are straight in shape, as are the sides 23a of the protrusions 23 of the first embodiment shown in FIG. 3. On the other hand, the LED-shifted sides 43b of the projections 43 shown in FIG. 6 are curved, different from the sides 23b of the protrusions 23 shown in FIG. 3. The embodiment shown in FIG. 3 has the flat portion 24 between adjacent protrusions 23, while the second embodiment shown in FIG. 6 has no flat portion between the projections 43. The function of the flat portions 24 is achieved by part of the curves of the LED-shifted side 43b.

The concrete shape of the LED-shifted side 43b of each projection 43 is as follows: referring to FIG. 7A, the upper half of the projection 43 with a height h, that is, the portion higher than the line of height h/2 is part of a circle with a radius $R_t$ and with the intersection $P_c$ between the perpendicular from the vertex $P_t$ of the projection 43 and the line of height h/2 as the center. The lower half of the projection 43, that is, the portion lower than the line of height h/2 is part of a circle with a radius $R_b$ and with the intersection $P_c'$ between the line extending from the base vertex $P_b$ of the projection 43 in the column direction Y and the line of height h/2 as the center. For example, $R_t$ can be set at 0.05 mm, and $R_b$ can be set at 0.05 mm.

As shown in FIG. 6, this embodiment also has one LED 21L on the left of the center line C of the light guide 42 in the direction of the width, and the other LED 21R on the right. The projections 43 are disposed in parallel on the surface of the light-incident surface 42a. The projections 43L on the left of the center line C constitute a projection group that receives the light from the left LED 21L. The projections 43R on the right of the center line C constitute a projection group that receives the light from the right LED 21R. The projections 43 in the same group have the same asymmetrical shape. The projections 43 are different in the orientation of the asymmetrical shape between the different groups. Specifically, the shape of the projections 43L in the left group and the shape of the projections 43R in the right group are axisymmetrical, or mirror symmetrical, about the center line C. However, the overall arrangement of the projections 43L in the left group and the projections 43R in the right group may be either axisymmetrical or not axisymmetrical.

Referring to FIG. 7B, most of the light incident on the light-incident surface 42a on the left of the center line C of the light guide 42 is refracted to the left (toward the left end face $F_L$ of FIG. 6), as indicated by the arrow L1, by the LED-shifted side 43b. Thus, the light radiation area $\alpha_L$ (that is, the optical axis) can be changed from the direction of 90° from 0 o'clock to 6 o'clock (in the column direction Y) to the direction of 180° from 3 o'clock to 9 o'clock (in the row direction X), as indicated by the broken lines in FIG. 6. This increases the amount of light traveling to the left-end area C in the light guide 42. On the other hand, as shown in FIG. 7B, most of the light incident on the light-incident surface 42a on the right of the center line C of the light guide 42 is refracted to the right (toward the right end face $F_R$ of FIG. 6) by the LED-shifted side 43b of the protrusion 43R, as indicated by the arrow L1. Thus, the light radiation area $\alpha_R$ (that is, the optical axis) can be changed from the direction of 90° from 0 o'clock to 6 o'clock (in the column direction Y) to the direction of 0° from 9 o'clock to 3 o'clock (in the row direction X) as indicated by the broken lines in FIG. 6. This increases the amount of light traveling to the right-end area B in the light guide 42.

Thus, changing the direction of the optical axes of the light emitted from the LEDs 21L and 21R prevents the light emitted from the two LEDs 21R and 21L from overlapping in the central area A in the light guide 42. This makes the luminous intensity in the light-exiting surface 42b of the light guide 42 uniform and as such, makes the intensity of the light exiting from the light-exiting surface 42b uniform.

This embodiment has no flat portion between the adjacent projections 43. However, the projections 43 offer the same advantages as the flat portions 24 shown in FIG. 3, because the projections 43 allow the light introduced thereto to travel in the direction of 90° from 0 o'clock to 6 o'clock (in the column direction Y) at the area in the vicinity of the vertex $P_t$ (specifically, the area where the angle between the tangent of the circle with radius $R_t$ and the perpendicular from the vertex $P_t$ is substantially parallel to the light-incident surface 42a) and the area in the vicinity of the base vertex $P_b$ (specifically, the area where the angle between the tangent of the circle with radius $R_b$ and the perpendicular from the vertex $P_t$ is substantially parallel to the light-incident surface 42a). Furthermore, the projections 43 of FIG. 6 can be mechanically strong so as to prevent damage to the tips thereof, because they can be larger in the width of the tips than the protrusions 23 of FIG. 3 formed of the straight lines.

Third Embodiment of Illumination System and Liquid Crystal Device

Figure 8:
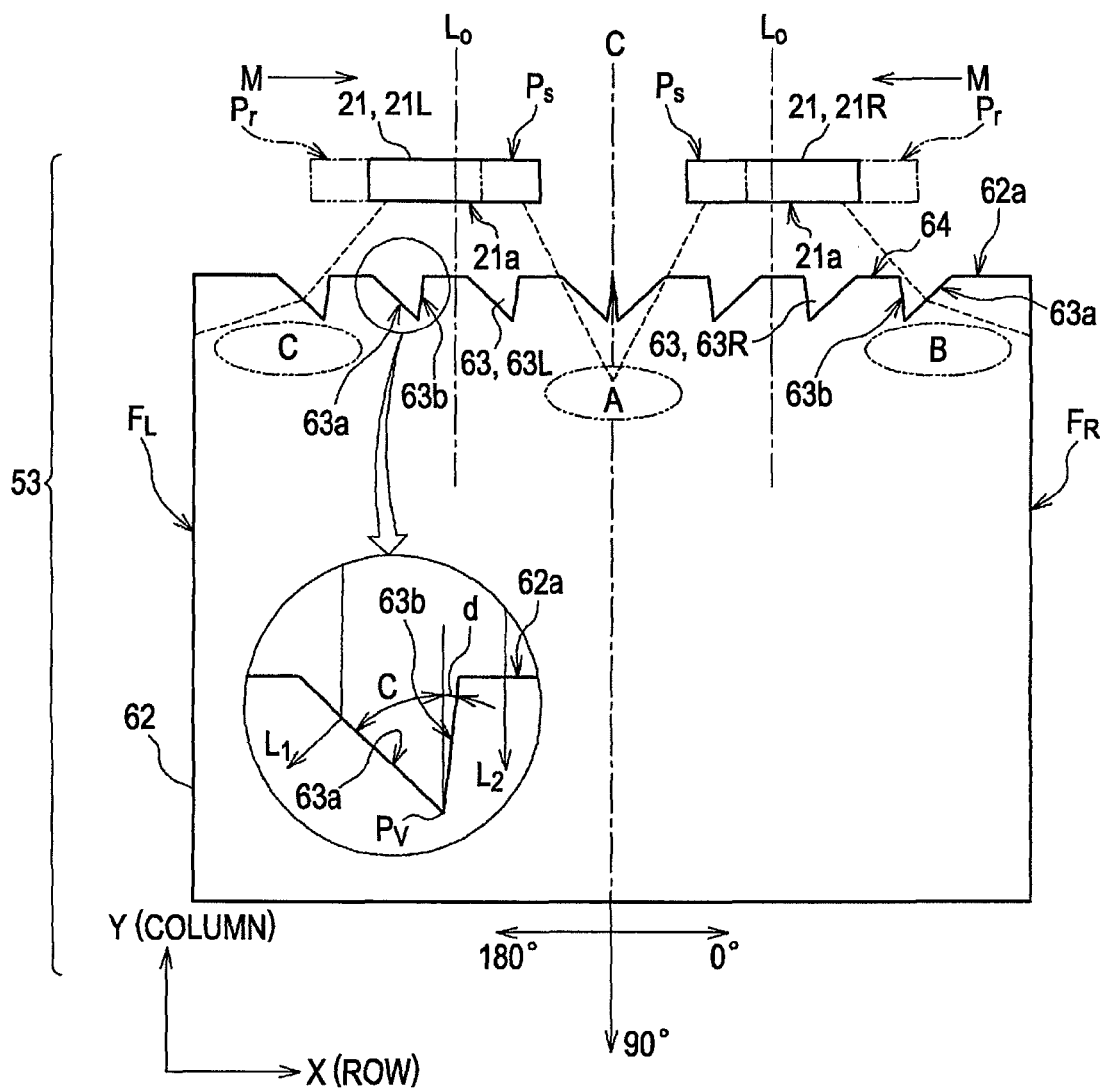
FIG. 8 is a plan view of essential parts of an illumination system according to yet another embodiment of the invention.

An illumination system and a liquid crystal device according to yet another embodiment of the invention will be described. The overall structure of the liquid crystal device according to this embodiment is substantially the same as that of the liquid crystal device 1 shown in FIG. 1 except the structure of the light-incident surface of the light guide. This embodiment has a plurality of recesses on the light-incident surface of the light guide, in place of the protrusions 23 shown in FIG. 3. FIG. 8 is a plan view of an illumination system 53 according to this embodiment, which is an essential part of the liquid crystal device 1 of FIG. 1, as viewed from the direction of the arrow A.

A light guide 62 has a plurality of bilaterally asymmetrical recesses 63 on the surface of the light-incident surface 62a. A plurality of recesses 63L on the left of the center line C receives the light from the left LED 21L, and a plurality of recesses 63R on the right of the center line C receives the light from the right LED 21R. The orientations of the asymmetric cross sections of the recesses 63 are the same in the same group. The cross sections of the recesses 63 on the left and right are axisymmetrical or mirror symmetrical about the center line C. The overall arrangement of the recesses 63 may be either axisymmetrical or not axisymmetrical.

Each recess 63 is bilaterally asymmetrical triangular in cross section in which angles of inclination on the right and left are different. Between adjacent recesses 63 are provided flat portions 64. The flat portions 64 are parallel to the light-emitting section 21a of the LED 21. Let c be the angle between the side 63a of the triangular recess 63 opposite to the LED shift direction M and the perpendicular from the base vertex $P_v$ of the recess 63 to the light-incident surface 62a (that is, the extension of the flat portion 64), and let d be the angle between the perpendicular and the side 63b in the LED shift direction M, $c > d$ holds.

In the illumination system 53 of this embodiment, most of the light incident of the light-incident surface 62a on the left of the center line C of the light guide 62 is refracted toward the left end face $F_L$, as indicated by the arrow L1, by the side 63a of the recess 63L opposite to the LED shift direction M. Thus, the optical axis of the light introduced to the light guide 62 can be changed from the direction of 90° from 0 o'clock to 6 o'clock (in the column direction Y) to the direction of 180° from 3 o'clock to 9 o'clock (in the row direction X). This increases the amount of light traveling to the left-end area C in the light guide 62.

On the other hand, most of the light incident on the light-incident surface 62a on the right of the center line C of the light guide 62 is refracted toward the right end face $F_R$ by the side 63b of the recess 63R opposite to the LED shift direction M, as indicated by the arrow L1. Thus, the optical axis of the light introduced to the light guide 62 can be changed from the direction of 90° from 0 o'clock to 6 o'clock (in the column direction Y) to the direction of 0° from 9 o'clock to 3 o'clock (in the row direction X). Thus, the amount of light traveling to the right-end area B in the light guide 62 can be increased.

Thus, changing the direction of the optical axes of the light emitted from the LEDs 21L and 21R prevents the light emitted from the two LEDs 21R and 21L from overlapping at the central area A in the light guide 62. Since the light is refracted by the recesses 63, the light traveling to the central area A is decreased. However, the flat portions 64 disposed between adjacent recesses 63 allow the light to pass therethrough toward the perpendicular from the flat portions 64 to the light guide 62. This makes the intensity of the light applied to the surface of the light guide 62 uniform and thus makes the intensity of the light exiting from the light-exiting surface 62b uniform.

Other Embodiments

Having described the invention as related to the preferred embodiments, it is our intention that the invention be not limited by the embodiments and that various changes and modifications may be made without departing from the spirit and scope of the invention as hereinafter claimed.

For example, the foregoing embodiments apply the invention to an illumination system using two LEDs as light source. However, the invention can also be applied to illumination systems having one LED or three or more LEDs.

First Embodiment of Electronic Device

An electronic device according to an embodiment of the invention will be described. It is to be understood that this embodiment is merely an example of the invention and that the invention is not limited to this embodiment.

Figure 9:
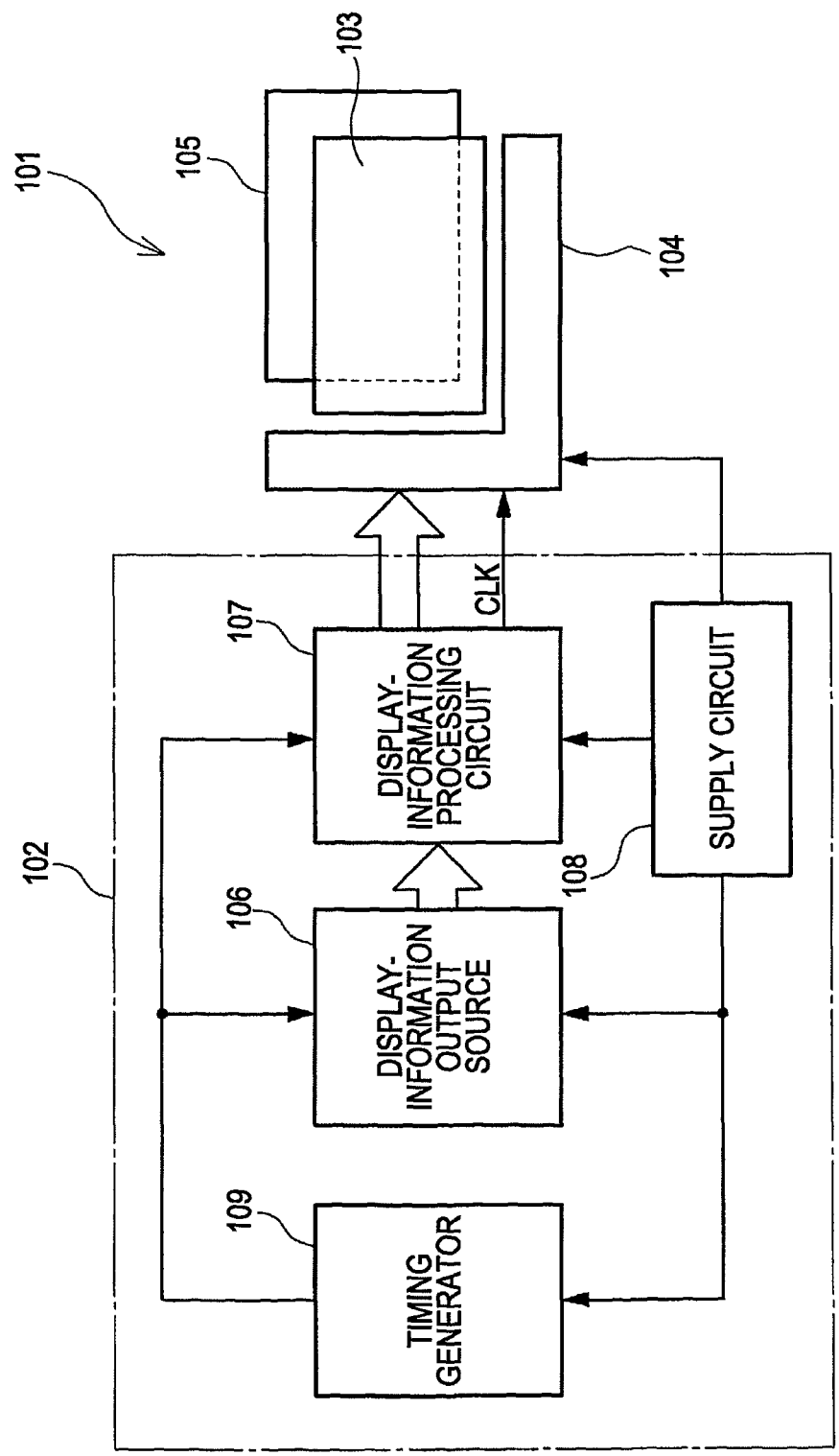
FIG. 9 is a block diagram of an electronic device according to an embodiment of the invention.

FIG. 9 shows an electronic device according to an embodiment of the invention. The electronic device includes a liquid crystal device 101 and a control circuit 102 therefor. The control circuit 102 includes a display-information output source 106, a display-information processing circuit 107, a supply circuit 108, and a timing generator 109. The liquid crystal device 101 includes a liquid crystal panel 103, a driving circuit 104, and an illumination system 105.

The display-information output source 106 is provided with a memory such as a random access memory (RAM), storage units including various disks, and a tuning circuit that tunes a digital image signal and outputs it. The display-information output source 106 provides display information such as image signals of a predetermined format to the display-information processing circuit 107 in response to various clock signals generated from the timing generator 109.

The display-information processing circuit 107 is provided with a large number of well-known circuits such as an inverting amplifier circuit, a rotation circuit, a gamma correction circuit, and a clamping circuit, and processes input display information to apply image signals to the driving circuit 104 together with clock signals CLK. The driving circuit 104 is a general name for a scanning-line driving circuit, a data-line driving circuit, and a test circuit. The supply circuit 108 supplies predetermined supply voltage to the above components.

The liquid crystal device 101 may be configured by the liquid crystal device 1 shown in FIG. 1. The liquid crystal device 1 can change the optical axis of the light incident on the light guide 22 since the light-incident surface 22a of the light guide 22 of the illumination system 3 has multiple bilaterally asymmetric protrusions 23 and as such, it can distribute the intensity of the light exiting from the light guide 22 evenly in the light-exiting surface 22b. Thus, the luminance of the display of the liquid crystal device 1 can be made uniform. Accordingly, the electronic device of this embodiment can also provide uniform-luminance display.

Second Embodiment of Electronic Device

Figure 10:
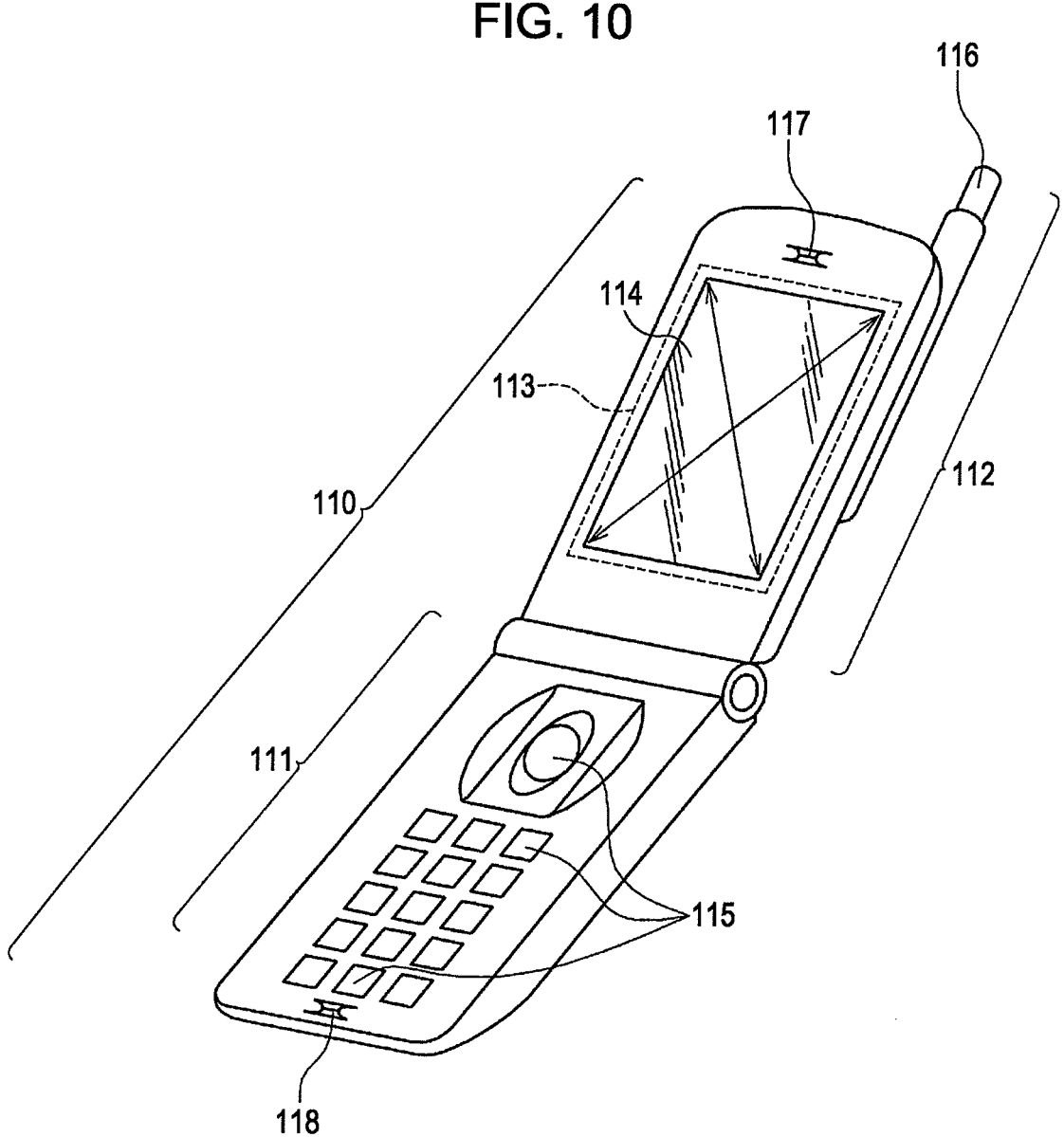
FIG. 10 is a perspective view of a portable phone which is an electronic device according to another embodiment of the invention.
Figure 12A:
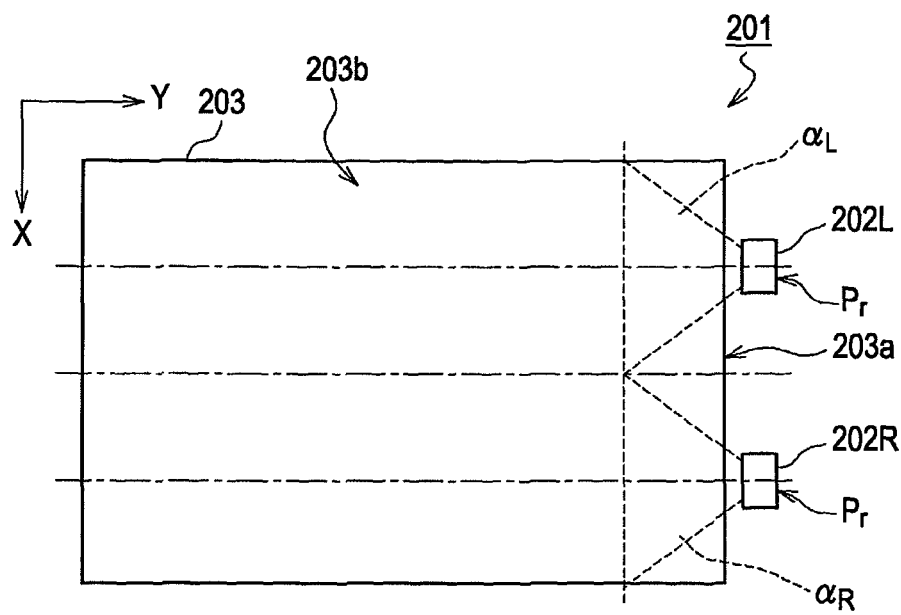
FIG. 12A is a plan view of a related-art illumination system in which the light sources are not shifted.
Figure 12B:
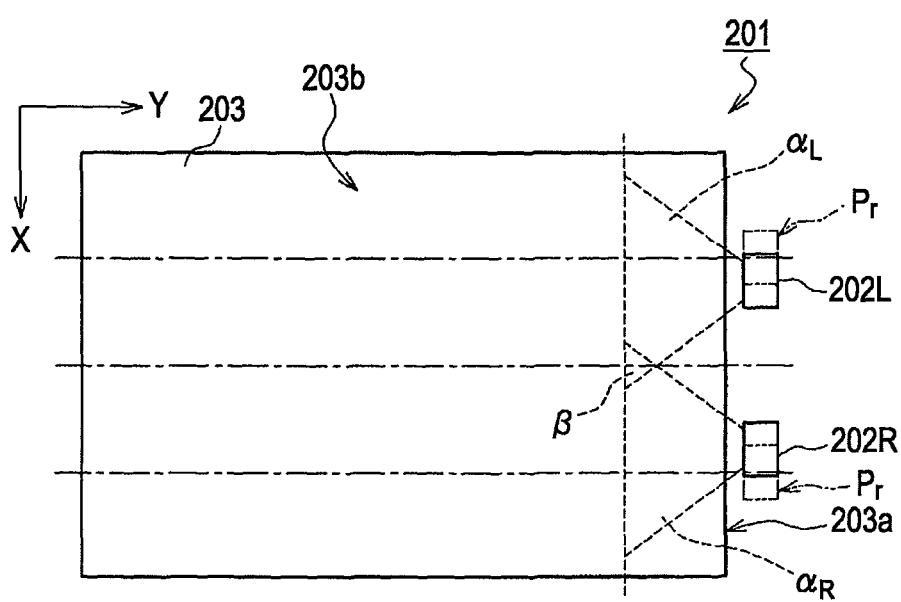
FIG. 12B is a plan view of a related-art illumination system in which the light sources are shifted.

FIG. 10 shows a portable phone, denoted by 110, which is an electronic device according to another embodiment of the invention. The portable phone 110 includes a main body 111 and a display body 112 which is foldable with respect to the main body 111. A display 113 configured by the liquid crystal device is disposed in the display body 112. The portable phone 110 displays various information on telecommunications on the display screen 114 of the display body 112. The main body 111 has operation buttons 115.

One end of the display body 112 has a telescopic antenna 116. A receiver 117 at the upper part of the display body 112 has a built-in speaker (not shown). A transmitter 118 at the lower end of the main body 111 has a built-in microphone (not shown). A controller for controlling the operation of the display 113 is housed in the main body 111 or the display body 112 as part of a controller for the whole portable phone or separately from the controller.

The display 113 can be configured by the liquid crystal device 1 shown in FIG. 1. The liquid crystal device 1 can change the optical axis of the light incident on the light guide 22 and so can make the intensity of the light exiting from the light guide 22 uniform in the light-exiting surface 22b since the light guide 22 of the illumination system 3 has the bilaterally asymmetric protrusions 23 on the light-incident surface 22a and as such, it can make the luminance of the display of the liquid crystal device 1 uniform. Accordingly, the electronic device of this embodiment can also provide uniform-luminance display.

Examples of the electronic device include, in addition to the above-described portable phone, portable computers, liquid-crystal televisions, viewfinder or monitor-direct-view type videotape recorders, car navigation systems, pagers, electronic notebooks, calculators, word processors, workstations, TV phones, and POS terminals.

EXAMPLE

The luminance distribution of the illumination system 3 shown in FIG. 3 was simulated using ray-tracing simulation software (Product Name: Light Tools). Specifically, the shape of the light guide 22 was modeled in a process according to the software, under which the luminance distribution at the light-incident surface of the light guide 22 taken along line Z5-Z5 of FIG. 3 was simulated. The simulation was run for the portion corresponding to one LED 21, that is, the portion shown in FIG. 5A.

The main parameters of the simulation are (1) the distance between the LED 21 and the light-incident surface 22a, (2) the material of the light guide 22, (3) the thicknesses of the light guide 22 and the LED 21, (4) the refraction index of the light guide 22, and (5) the orientation distribution of the LED 21. The simulation was run, with the parameters set in specified values, for the case in which the shape of the protrusions 23 shown in FIG. 5A was the following three types (a) to (c), where (c) is of the shape of the protrusions 23 of the embodiment shown in FIG. 5A.

(a) Slope angle a=90°, slope angle b=90°
(b) Slope angle a=45°, slope angle b=45°
(c) Slope angle a=9°, slope angle b=45°

The results of the simulation are shown in the graphs of FIG. 11. The horizontal axis of the graphs shows the orientation distribution with angles, which correspond to the coordinate system of 0° to 180° shown in FIG. 5A. The vertical axis of the graphs indicates the luminous intensity of light, scaled in watt per steradian (W/Sr).

The graphs of FIG. 11 show that the radiant intensity of light of (a) and (b) in which the shape of each projection is substantially bilaterally symmetrical about 90°. In contrast, the radiant intensity of (c) in which the shape of each projection is bilaterally asymmetrical decreases in the range from 0° to 90°, and increases in the range from 90° to 180°, as compared with (a) and (b). This shows that, in FIG. 5A, the light traveling in the direction from 0° to 90° decreases, and the light traveling in the direction from 90° to 180° increases. In other words, when the slope angle a of the sides of the protrusions 23 opposite to the LED shift direction M is set at 9° and the angle b of the sides in the LED shift direction M is set at 45°, the optical axis of the light emitted from the LED 21 into the light guide 22 can be changed to an appropriate direction.

What is claimed is:

1. An illumination system comprising:
   a light source that emits light; and
   a light guide that introduces the light through a light-incident end face facing the light source and that lets out the light from a light-exiting surface adjacent to the light-incident end face, wherein
   the light source is disposed adjacent to the light-incident end face and a position between a center line that divides the light-exiting surface of the light guide equally in the light-exiting direction of the light source and a line parallel to the center line, the line parallel to the center line being halfway between the center line and an edge of the light guide;
   the light-incident end face of the light guide has at least one projection or recess in a direction intersecting the light-exiting direction of the light source;
   the projection or recess is inclined in one direction intersecting the light-exiting direction of the nearest of the light source and a second light source;
   the projection refracts the light in the direction of inclination intersecting the light-exiting direction, and the recess refracts the light in the direction opposite to the direction of inclination intersecting the light-exiting direction; and
   the projection or recess is configured to change a first optical axis of the light emitted from the light source and a second optical axis of the light emitted from the second light source, wherein changing the direction of the optical axes of the light emitted from the light source and the second light source prevents the light emitted from each of the light source and the second light source from overlapping at a central area in the light guide.

2. The illumination system according to claim 1, wherein, the projection refracts, in the light guide, the light emitted from the light source in the direction opposite to the direction of inclination of the recess.

3. The illumination system according to claim 1, wherein, the projection or recess provided on the light-incident end face of the light guide comprises a plurality of projection or recesses.

4. The illumination system according to claim 1, wherein, there are flat portions between the projections or recesses, and each projection or recess is triangular in shape with respect to an extension of the flat portion.

5. The illumination system according to claim 4, wherein, a relationship between angles of inclination of both sides of the projection formed with a perpendicular from a vertex of the projection to the extension of the flat portion, as viewed from the light-exiting surface, is expressed as $$a<b,$$

where a is the angle of inclination of the one side intersecting the light-exiting direction of the light source and b is the angle of inclination of the other side.

6. The illumination system according to claim 4, wherein, a relationship between angles of both sides of the recess formed with a perpendicular from a base vertex of the recess to the extension of the flat portion, as viewed from the light-exiting surface, is express as $$c>d$$

where c is the angle of inclination of the one side intersecting the light-exiting direction of the light source and d is the angle of inclination of the other side.

7. The illumination system according to claim 1, wherein, the projection or recess has two sides in the direction intersecting the light-exiting direction of the light source, wherein the one side is straight and the other side is curved, and wherein there is no flat portion between the projections or the recesses.

8. A liquid crystal device comprising:
   a liquid crystal panel having a liquid crystal layer and a polarizing layer that agrees with the liquid crystal layer in plan view; and
   an illumination system that applies light onto the liquid crystal panel, wherein
   the illumination system is the illumination system according to claim 1.

9. An electronic device comprising the liquid crystal device according to claim 8.

10. An illumination system comprising:
    a first light source and a second light source that emit light; and
    a light guide that introduces the light through a light-incident end face facing the light source and that lets out the light from a light-exiting surface adjacent to the light-incident end face, wherein
    the first light source is disposed adjacent to the light-incident end face on one side of a center line that divides the light-exiting surface of the light guide equally in the light-exiting direction of the light source;
    the second light source disposed adjacent to the light-incident end face and on the other side of the center line;
    the first light source and the second light source disposed closer to the center line than a quarter of a width of the light-incident end face;
    the light-incident end face of the light guide has at least one projection or recess in a direction intersecting the light-exiting direction of the nearest of the first light source and second light source;
    the at least one projection or recess has an asymmetrical shape inclined in the direction intersecting the light-exiting direction of the nearest of the first light source and second light source;
    the projection refracts the light in the direction of inclination intersecting the light-exiting direction, and the recess refracts the light in the direction opposite to the direction of inclination intersecting the light-exiting direction; and
    the at least one projection or recess is inclined in one of directions intersecting the light-exiting direction and configured to change a first optical axis of the light emitted from the first light and a second optical axis of the light emitted from the second light, wherein changing the direction of the optical axes of the light emitted from the first light and the second light prevents the light emitted from each of the first light and the second light from overlapping at a central area in the light guide.

* * * * *